(12) United States Patent
Kizhepat et al.

(10) Patent No.: US 9,172,982 B1
(45) Date of Patent: Oct. 27, 2015

(54) AUDIO SELECTION FROM A MULTI-VIDEO ENVIRONMENT

(75) Inventors: Govind Kizhepat, Los Altos Hills, CA (US); Yung-Hsiao Lai, Fremont, CA (US); Erik Matthew Nystrom, Santa Clara, CA (US)

(73) Assignee: Vuemix, Inc., Santa Clara, CA (US)

( * ) Notice: Subject to any disclaimer, the term of this patent is extended or adjusted under 35 U.S.C. 154(b) by 21 days.

(21) Appl. No.: 13/277,442

(22) Filed: Oct. 20, 2011

Related U.S. Application Data

(63) Continuation-in-part of application No. 13/252,296, filed on Oct. 4, 2011, which is a continuation-in-part of application No. 13/237,874, filed on Sep. 20, 2011, which is a continuation-in-part of application No. 13/154,222, filed on Jun. 6, 2011.

(51) Int. Cl.
G06F 15/16 (2006.01)
H04N 21/2365 (2011.01)
H04N 5/54 (2006.01)

(52) U.S. Cl.
CPC ............. *H04N 21/2365* (2013.01); *H04N 5/54* (2013.01)

(58) Field of Classification Search
CPC .................... H04N 21/4341; H04N 21/23614; H04N 5/04; H04N 5/25; H04N 21/2365
USPC ........................................................ 709/231
See application file for complete search history.

(56) References Cited

U.S. PATENT DOCUMENTS

| | | | |
|---|---|---|---|
| 5,408,274 A | 4/1995 | Chang | |
| 5,513,181 A | 4/1996 | Bresalier | |
| 5,594,507 A | 1/1997 | Hoarty | |
| 5,623,308 A * | 4/1997 | Civanlar et al. | 375/240.01 |
| 5,691,768 A * | 11/1997 | Civanlar et al. | 375/240.01 |
| 5,794,018 A * | 8/1998 | Vrvilo et al. | 713/400 |
| 5,872,874 A | 2/1999 | Natarajan | |
| 5,959,639 A | 9/1999 | Wada | |
| 5,984,512 A * | 11/1999 | Jones et al. | 709/219 |
| 6,034,678 A | 3/2000 | Hoarty | |
| 6,064,377 A | 5/2000 | Hoarty | |
| 6,100,883 A | 8/2000 | Hoarty | |
| 6,205,582 B1 | 3/2001 | Hoarty | |
| 6,253,238 B1 | 6/2001 | Lauder | |
| 6,504,990 B1 * | 1/2003 | Abecassis | 386/283 |
| 6,748,020 B1 * | 6/2004 | Eifrig et al. | 375/240.26 |
| 6,925,499 B1 | 8/2005 | Chen et al. | |

(Continued)

FOREIGN PATENT DOCUMENTS

EP 2343891 A2 7/2011

OTHER PUBLICATIONS

U.S. Appl. No. 13/369,169, filed Feb. 8, 2012, entitled "Video Transcoder Stream Multiplexing Systems and Methods".

(Continued)

*Primary Examiner* — Kevin Bates
*Assistant Examiner* — Clarence D McCray
(74) *Attorney, Agent, or Firm* — Adams Intellex, PLC

(57) ABSTRACT

A method and system for audio selection is disclosed. Multiple active videos are rendered in a single video stream and the multiple active videos are simultaneously displayed on a client machine. A user selects a video from among the multiple active videos for which associated audio is presented. As the user selects different videos the previous audio is stopped and the new audio is played. The new audio is synchronized to the selected video.

25 Claims, 7 Drawing Sheets

(56) References Cited

U.S. PATENT DOCUMENTS

| | | | |
|---|---|---|---|
| 6,931,660 B1* | 8/2005 | Kalluri et al. ................ 725/131 |
| 6,993,081 B1* | 1/2006 | Brunheroto et al. ..... 375/240.28 |
| 7,027,516 B2* | 4/2006 | Anderson et al. ........ 375/240.26 |
| 7,028,096 B1 | 4/2006 | Lee |
| 7,039,048 B1* | 5/2006 | Monta et al. ................ 370/389 |
| 7,039,784 B1 | 5/2006 | Chen et al. |
| 7,127,619 B2 | 10/2006 | Unger |
| 7,324,555 B1 | 1/2008 | Chen et al. |
| 7,334,132 B1* | 2/2008 | Kumar et al. ................ 713/189 |
| 7,349,944 B2* | 3/2008 | Vernon et al. ............... 709/204 |
| 7,408,961 B2 | 8/2008 | Kaku |
| 7,499,416 B2 | 3/2009 | Polomski |
| 7,516,136 B2 | 4/2009 | Lee |
| 7,516,243 B2 | 4/2009 | Wee |
| 7,543,326 B2 | 6/2009 | Moni |
| 7,546,353 B2* | 6/2009 | Hesselink et al. ........... 709/216 |
| 7,555,006 B2 | 6/2009 | Wolfe |
| 7,555,718 B2 | 6/2009 | Girgensohn |
| 7,565,429 B1* | 7/2009 | Fernandez ................... 709/224 |
| 7,634,795 B2 | 12/2009 | Dureau |
| 7,636,395 B2 | 12/2009 | Yongfang |
| 7,647,413 B2 | 1/2010 | Kirkland |
| 7,675,873 B2 | 3/2010 | Krstulich |
| 7,676,590 B2 | 3/2010 | Silverman |
| 7,698,365 B2 | 4/2010 | Van Buskirk |
| 7,720,023 B2 | 5/2010 | Bais |
| 7,734,692 B1 | 6/2010 | Kaplan |
| 7,738,766 B2 | 6/2010 | Silverman |
| 7,778,206 B2 | 8/2010 | Shaffer |
| 7,783,767 B2 | 8/2010 | Collazo |
| 7,792,062 B1 | 9/2010 | Fandrianto |
| 7,836,193 B2* | 11/2010 | Ducharme ................... 709/231 |
| 7,864,808 B2 | 1/2011 | Krause |
| 7,873,972 B2 | 1/2011 | Zaslavsky et al. |
| 7,903,815 B2 | 3/2011 | Bacon |
| 8,078,729 B2 | 12/2011 | Kozat et al. |
| 8,117,638 B2* | 2/2012 | Perlman ....................... 725/126 |
| 8,127,058 B1 | 2/2012 | Sha et al. |
| 8,156,236 B2* | 4/2012 | Costanzo et al. ............ 709/231 |
| 8,250,617 B2* | 8/2012 | Hensgen et al. ............... 725/93 |
| 8,254,455 B2* | 8/2012 | Wu et al. ................. 375/240.16 |
| 8,516,529 B2* | 8/2013 | Lajoie et al. .................... 725/87 |
| 8,582,656 B2* | 11/2013 | Lin et al. .................. 375/240.18 |
| 8,619,874 B2* | 12/2013 | Lin et al. .................. 375/240.26 |
| 8,654,981 B2* | 2/2014 | Gillon et al. ................. 380/281 |
| 8,731,053 B2* | 5/2014 | Karegoudar ............ 375/240.06 |
| 2002/0067907 A1* | 6/2002 | Ameres ........................... 386/46 |
| 2003/0146915 A1 | 8/2003 | Brook et al. |
| 2004/0015551 A1* | 1/2004 | Thornton ...................... 709/204 |
| 2004/0015597 A1* | 1/2004 | Thornton ...................... 709/231 |
| 2004/0080671 A1* | 4/2004 | Siemens et al. ............... 348/473 |
| 2004/0083302 A1* | 4/2004 | Thornton ...................... 709/231 |
| 2005/0008240 A1 | 1/2005 | Banerji |
| 2005/0137958 A1 | 6/2005 | Huber et al. |
| 2006/0036758 A1* | 2/2006 | Zhodzishsky et al. ........ 709/233 |
| 2006/0179469 A1 | 8/2006 | Fransman et al. |
| 2007/0028288 A1 | 2/2007 | Sigmon, Jr. et al. |
| 2007/0200923 A1 | 8/2007 | Eleftheriadis |
| 2007/0204302 A1* | 8/2007 | Calzone ........................... 725/46 |
| 2007/0263072 A1* | 11/2007 | Lochbaum et al. ......... 348/14.08 |
| 2008/0036917 A1 | 2/2008 | Pascarella et al. |
| 2008/0127272 A1 | 5/2008 | Cragun et al. |
| 2008/0162713 A1 | 7/2008 | Bowra et al. |
| 2008/0170622 A1 | 7/2008 | Gordon |
| 2008/0178249 A1 | 7/2008 | Gordon |
| 2009/0041118 A1 | 2/2009 | Pavlovskaia et al. |
| 2009/0123123 A1 | 5/2009 | Piesing |
| 2009/0154502 A1* | 6/2009 | Ross et al. .................... 370/535 |
| 2010/0122294 A1 | 5/2010 | Craner |
| 2010/0141833 A1 | 6/2010 | Lemmers |
| 2010/0158109 A1 | 6/2010 | Dahlby et al. |
| 2010/0198982 A1* | 8/2010 | Fernandez .................... 709/231 |
| 2010/0251386 A1* | 9/2010 | Gilzean et al. .................. 726/28 |
| 2010/0313250 A1* | 12/2010 | Chow ................................ 726/5 |
| 2011/0007797 A1* | 1/2011 | Palmer et al. ............ 375/240.01 |
| 2011/0029109 A1* | 2/2011 | Thomsen et al. .............. 700/94 |
| 2011/0102671 A1 | 5/2011 | Tsai |
| 2011/0145865 A1 | 6/2011 | Simpson |
| 2011/0158113 A1 | 6/2011 | Nanda |
| 2011/0200093 A1 | 8/2011 | Gabara et al. |
| 2011/0231878 A1 | 9/2011 | Hunter et al. |
| 2011/0249026 A1 | 10/2011 | Singh |
| 2012/0192229 A1* | 7/2012 | Hunter ............................. 725/38 |
| 2012/0257252 A1 | 10/2012 | Fritsch |
| 2013/0019261 A1 | 1/2013 | Huber et al. |
| 2013/0127980 A1* | 5/2013 | Haddick et al. ............ 348/14.08 |
| 2014/0369503 A1* | 12/2014 | Kerr ................................. 381/2 |

OTHER PUBLICATIONS

Vbrick, "MPEG-2 Transport vs. Program Stream," VBrick Systems Inc., Wallingford, CT, p. 1-10, 2007.

Magnum Semiconductor, "DX7313," Magnum Semiconductor, Milpitas, CA, p. 1-2; downloaded from www.magnumsemi.com on Jun. 2, 2011.

ViXS, "Broadcast Professional Series," ViXS Systems, Toronto, Ontario, p. 1-2; downloaded from www.vixs.com on Jun. 2, 2011.

Chang et al., "Manipulation and Compositing of MC-DCT Compressed Video," IEEE J. Selected Areas in Comm., IEEE Communications Society, New York, NY, 13(1):1-11, Jan. 1995.

Chang, "Compositing and Manipulation of Video Signals for Multimedia Network Video Services," Ph. D Thesis, University of California Berkeley, Berkeley, CA, p. 1-212, 1993.

ITU-T, "H.264 (Mar. 2010), Advanced video coding for generic audiovisual services," Telecommunication Standardization Sector of ITU, Geneva, Switzerland, p. 1-676, Mar. 2010.

"A Guide to MPEG Fundamentals and Protocol Analysis: Updated with QoS/QoE Diagnostics and Troubleshooting Primer", Copyright © 2012, Tektronix, Inc., http://www.tek.com/video-test.

* cited by examiner

AUDIO SELECTION FROM A MULTI-VIDEO ENVIRONMENT

RELATED APPLICATIONS

This application is a continuation-in-part of U.S. patent application "Program Selection from Multiple Video Channels" Ser. No. 13/252,296, filed Oct. 4, 2011 which is a continuation-in-part of U.S. patent application "Single Stream Generation for Multiple Independent Videos" Ser. No. 13/237,874, filed Sep. 20, 2011 which is a continuation-in-part of U.S. patent application "Scalable Real-Time Video Compositing Systems and Methods" Ser. No. 13/154,222, filed Jun. 6, 2011. Each of the foregoing applications is hereby incorporated by reference in its entirety.

FIELD OF INVENTION

This application relates generally to video streaming and more particularly to audio selection from a multi-video environment.

BACKGROUND

Streaming of video content remains a complex and difficult technical challenge. From locating videos, to head-end storage of video content, to the delivery of the requested videos, all aspects of the video streaming system must be carefully designed and implemented. The complex delivery problem is further complicated when multiple videos may be of interest to the requester or to a viewer. Again, careful techniques and algorithms must be developed in order for proper searching and for content delivery to be efficient, timely, and effective. Complex software and hardware systems are required to implement a video collection and delivery system. In such a system, the software may be stored and executed on a variety of processors.

The following challenging steps may be included in a complex, user-driven, video content delivery system. For example, one difficulty might be to effectively and efficiently locate video content on the web. A search might be fine-tuned through a variety of means to make the search more efficient and targeted toward content of interest. Another significant challenge might be the storage of the video content or information about the video content so that it can be located, retrieved quickly, and used for further analysis. Further, delivering content, both video and audio, within the context of network bandwidth limitations can be cumbersome and have its own logistical challenges. The presentation of video and its associated audio track may be problematic given buffering requirements in order to ensure no gaps in the playback. Networks and their distributed hardware have been designed so that disparate data packets can be distributed far and wide but these packets must be properly reassembled so a viewer can enjoy the video in a high quality viewing environment without thinking about the technical details. Indeed, a viewer often has neither technical understanding nor desire to understand the underlying technology. In all, the various steps must be carefully designed and executed in order to implement an effective video delivery system.

SUMMARY

Multiple active videos may be streamed in a single video stream to a client machine. The single video stream may be a single elementary stream or packetized elementary stream. One of the videos may be selected and audio from that video will be played based on the selection. A computer implemented method for audio selection is disclosed comprising: receiving a plurality of active videos wherein the plurality of active videos is received in a single video stream; displaying the plurality of active videos on a client machine; playing a first audio wherein the first audio is associated with a first of the plurality of active videos; requesting a second audio which is different from the first audio based on a selection; discontinuing playing of the first audio based on the selection; and playing of the second audio where the second audio is associated with a second of the plurality of active videos. The method may further comprise selecting one of the plurality of active videos to result in the selection. The method may further comprise receiving the second audio which was requested. The requesting of the second audio may comprise a request for audio with a time point that corresponds to a later time than a current time of the plurality of active videos that are being displayed. The method may further comprise buffering the second audio before the playing the second audio begins. The plurality of active videos may be displayed with a first media player and the playing of the second audio is played with a second media player. The first media player and the second media player may be synchronized based on timestamps. The first media player and the second media player may be synchronized based on elapsed times since start of a video. The plurality of active videos and the first audio and the second audio may be played by a single media player. The first audio may be synchronized with the first of the plurality of active videos. The first audio may be synchronized with the first of the plurality of active videos based on timestamps. The first audio may be synchronized with the first of the plurality of active videos based on elapsed times. The method may further comprise synchronizing the second audio with the second of the plurality of active videos. The second audio may be synchronized with the second of the plurality of active videos based on timestamps. The second audio may be synchronized with the second of the plurality of active videos based on elapsed times. The second audio may be further synchronized with the second of the plurality of active videos based on a time at which the second audio started playing. The synchronizing may include delaying the second audio. The synchronizing may include delaying the plurality of active videos. The plurality of active videos may be aggregated into the single video stream on a video streamer. The plurality of active videos may be decoupled from each of their respective audios. Each of the plurality of active videos may include less information than a corresponding original video. The first audio and the second audio may each have less buffering than the plurality of active videos. The method may further comprise displaying information on the second audio which was selected. A user may choose the second audio by clicking on one of the plurality of active videos.

In embodiments, a computer program product embodied in a non-transitory computer readable medium for audio selection may comprise: code for receiving a plurality of active videos wherein the plurality of active videos is received in a single video stream; code for displaying the plurality of active videos on a client machine; code for playing a first audio wherein the first audio is associated with a first of the plurality of active videos; code for requesting a second audio which is different from the first audio based on a selection; code for discontinuing playing of the first audio based on the selection; and code for playing of a second audio where the second audio is associated with a second of the plurality of active videos and where the playing of the second audio is based on the selection. In embodiments, a system for audio selection may comprise: a memory which stores instructions; one or more processors attached to the memory wherein the one or more processors, when executing the instructions which are stored, are configured to: receive a plurality of active videos wherein the plurality of active videos is received in a single video stream; display the plurality of active videos on a client machine; play a first audio wherein the first audio is associated with a first of the plurality of active videos; request a second audio which is different from the first audio based on a selection; discontinue playing of the first audio based on the selection; and play a second audio, which is different from the first audio, where the second audio is associated with a second of the plurality of active videos and where the playing of the second audio is based on the selection.

In some embodiments, a computer implemented method for audio selection may comprise: providing a plurality of active videos wherein the plurality of active videos are aggregated into a single video stream; providing a first audio which is associated with a first of the plurality of active videos; receiving a request for a second audio which is different from the first audio; stopping providing of the first audio; and providing the second audio. In embodiments, a computer program product embodied in a non-transitory computer readable medium for audio selection may comprise: code for providing a plurality of active videos wherein the plurality of active videos are aggregated into a single video stream; code for providing a first audio which is associated with a first of the plurality of active videos; code for receiving a request for a second audio which is different from the first audio; code for stopping providing of the first audio; and code for providing the second audio. In embodiments, a system for audio selection comprising: a memory which stores instructions; one or more processors attached to the memory wherein the one or more processors, when executing the instructions which are stored, are configured to: provide a plurality of active videos wherein the plurality of active videos are aggregated into a single video stream; provide a first audio which is associated with a first of the plurality of active videos; receive a request for a second audio which is different from the first audio; stop providing of the first audio; and provide the second audio.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
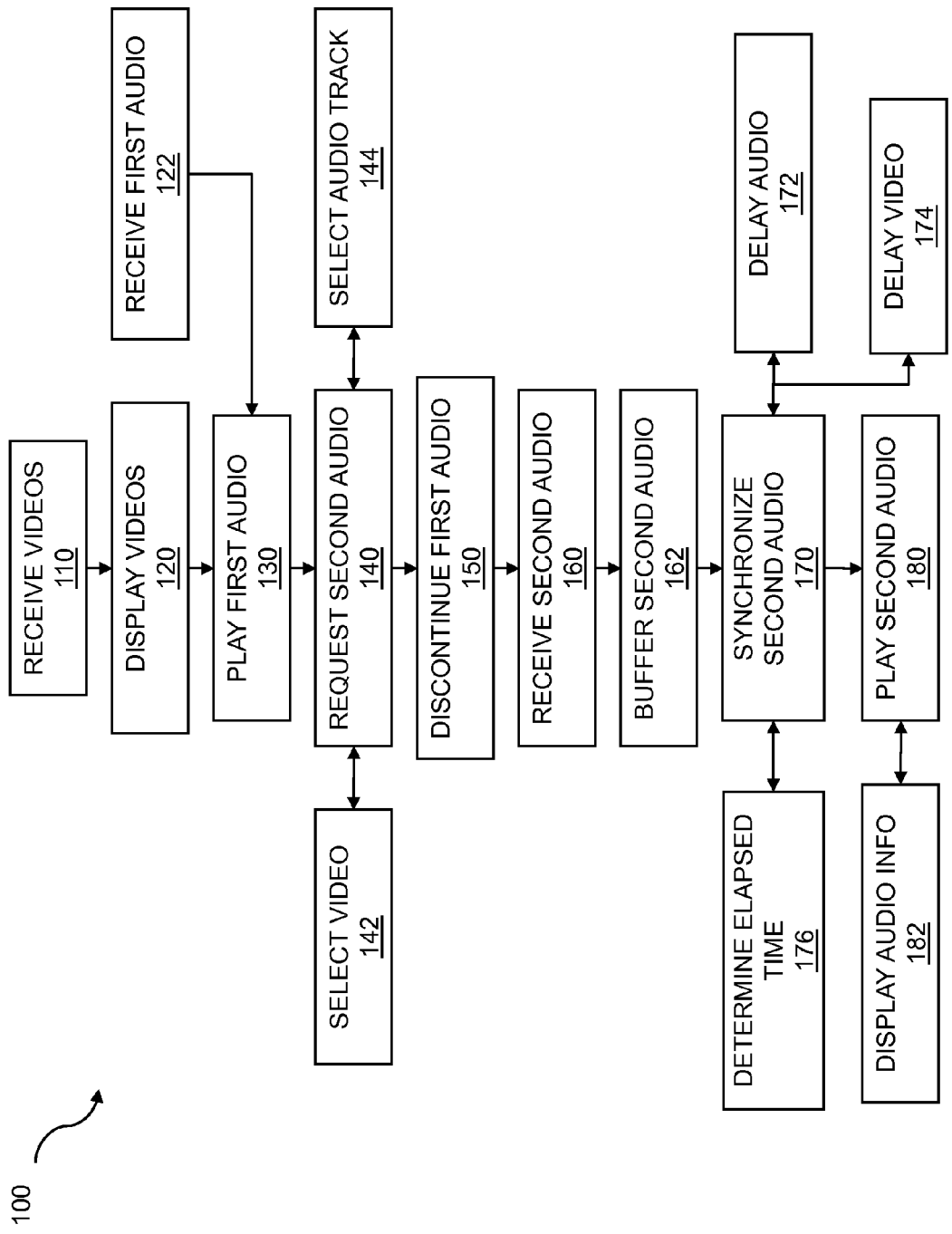
FIG. 1 is a flow diagram for switching audio.

The present disclosure provides a description of various methods, apparatus, and systems for audio selection in a multi-video environment. As more and more content is delivered across the internet in video form the selection of video becomes more problematic. Historically a search may return a snapshot from one frame of the video along with some descriptive text. Little of the video content can actually be conveyed with this limited format and the result may even be misleading or deceptive. The disclosed concepts allow for simultaneous streaming of multiple videos and selection of one of those videos for audio presentation.

The multiple videos are aggregated into a single video stream and sent to a client machine. The single video stream may include four, eight, sixteen, or some other number of videos. All of the videos may be simultaneously active, i.e. playing. One or more of the videos may come from a live video feed such as a network program, a news broadcast, a sporting event, or the like. Hence, to a video player the single video stream appears as a single video. However, when rendered, it contains multiple moving video images at predetermined locations. In one embodiment, a user clicks a cursor on one of the multiple moving video images to request the associated audio for the clicked-on video.

Some or all of the videos may be obtained from a database. A web crawler may traverse the internet and store information on videos or the videos themselves in the database. These videos may then be combined into a single video stream for playback on standard media viewers. One of the videos in the single video stream may be selected to display more information, activate audio playback, provide a larger version of the video, or to provide full screen video playback. The selection may be performed by a user of a client machine. The video and audio may each be buffered so that proper playback is uninterrupted.

When presented with numerous videos simultaneously, the user may wish to select one of the videos for audio presentation, such that the user can hear the audio for the selected video, while no audio is presented for the other currently displayed videos. The user may then select a different video for audio presentation and the system discontinues playing of the previous audio. The system goes on to fetch, decode, synchronize, and present the new audio. The synchronization may be performed by using timestamps in both the video and audio streams, and presenting video presentation units and audio presentation units that are within a predetermined temporal distance (e.g. 30 milliseconds) of each other. In alternate embodiments, synchronization may be based on elapsed time from the start of the video. Elapsed time may be tracked for each of the audio and the video and delay or advancement of either the audio or the video may be performed to maintain the synchronization. As part of the synchronizing process, audio and/or video frames may be skipped or delayed in order to synchronize the audio and video.

FIG. 1 is a flow diagram for switching audio. The flow 100 describes a computer implemented method for audio selection and may represent activity from a client perspective. The computer implemented method may involve client-server interaction. One or more client machines may be attached to a network and a server may be attached to the clients through an internet or intranet type network. The network may be wired, wireless, or a combination thereof. The flow 100 includes receiving a plurality of active videos 110 wherein the plurality of active videos is received in a single video stream. The single video stream may have been created by aggregating multiple videos into the single video stream. Active video means that the visible content of that video is being updated on a regular basis, such as 16, 24, 30 or some other number of frames per second (fps), although various embodiments may use higher refresh rates such as 60 fps or more, or lower refresh rates such as 10 fps or less. The videos may have been chosen based on a search query from the client, a request for a particular collection of videos, or by some other method that may be under the control of the client, the server, a content controller, or some other entity. In some embodiments, a portion of a video may be shown for one or more of the plurality of active videos. The portion may be a trailer, a snippet, a video sample, a repeating group of frames, a video loop, and so on. The portion may last for 10 seconds, 30 seconds, or some other amount of time before repeating.

A single video stream may be a single elementary stream, or packetized elementary stream or some other technology where one frame or field of video to be displayed at any one point in time. As used herein, a transport stream or program stream, having multiple elementary streams of video, may not be a single video stream, although if a transport stream or program stream has only a single elementary video stream, or its equivalent, that transport or program stream may still be considered a single video stream. Elementary stream, program stream, and transport stream are used herein consistently with the terms as defined by the motion picture experts group (MPEG) in standards such as MPEG 1, MPEG 2, MPEG 4, or other MPEG standard, but may apply more broadly than the specific definitions of those standards. Other embodiments may utilize different technology where multiple videos may be aggregated into a single video stream that is not simply a collection of multiple video streams.

The flow 100 continues with displaying the plurality of active videos 120 on a client machine. In numerous embodiments, this displaying of videos is simply referred to as the playing of videos. This displaying may be accomplished by displaying the single video stream that contains the plurality of active videos. In some embodiments, the plurality of active videos may be displayed as a full-screen display. In other embodiments, the plurality of active videos, or a portion thereof, may be shown in a window or a portion of the display. The plurality of active videos may be shown on any electronic display, including but not limited to, a computer display, a laptop screen, a net-book screen, a tablet computer, a cell phone display, a mobile device display, a remote with a display, or some other electronic display. In some cases there may be two or more displays. The plurality of active videos may be shown on one display with a selected video being shown on a second or third display and so on. Each video may be displayed in its own region and the regions may be arranged in a grid or other pattern. One of the active videos may be designated as the first video. This first video designation may, in some embodiments, be based on positioning of the region for the video within a display. For example, the leftmost video may be designated as the first video. The flow 100 includes receiving a first audio 122. The first audio may be received from the same location or URL as the videos which were received. In other embodiments, the audio may be received from a different location from the videos that were received. The flow 100 further includes playing the first audio 130 wherein the first audio is associated with a first of the plurality of active videos. The audio may include a single monaural or multi-channel sound track for the video, and/or may include other audio information, such as related music, commentary, or the sound track in other languages. In embodiments, the videos are played with one media player and the audio is played with a different media player. The first audio may be synchronized with the first of the plurality of active videos. The first audio may be synchronized with the first of the plurality of active videos based on elapsed times. The audio and video may each be buffered prior to playing the audio and video. The audio may have less buffering in some embodiments than the video.

A user may initiate an action to select another audio. The flow 100 may include selecting one of the plurality of active videos 142 to result in the selection. The selection process may take place by numerous methods and may depend on the type of device that is used as the client machine. In some embodiments, such as where a personal computer is used as the client machine, a keyboard and/or mouse may be used to select the one video. The user may mouse over an active video, numerically select a video, or in some other way select a video. In some embodiments the user may click on a video to select it, may use arrow keys to select a video, or may type in an identifier of the desired video. In other embodiments, such as a smart phone or a tablet, the user may simply touch the desired video to select it using a touch screen. Other methods of selecting the video may also be used, including, but not limited to, a remote control, voice commands, eye tracking, gesture recognition, or any other method. The flow 100 continues with requesting a second audio 140 which is different from the first audio. The requesting of the second audio may comprise a request for audio with a time point that corresponds to a later time than a current time of the plurality of active videos that are being displayed. By requesting a future time point for the audio, synchronizing the audio and video may be easier due to a delay between when audio is requested, when it is buffered, and when the audio is played. In embodiments, the flow 100 continues with selection of an audio track 144. Multiple tracks may exist for a given video. In some embodiments, these multiple tracks are included in a single audio stream. Audio for different languages may be provided for a video as well as one or more commentary tracks. In some cases, the audio track may be selected so that a language of choice or commentary may be played.

The flow 100 continues with discontinuing playing of the first audio 150 based on the selection which was made. The discontinuing may be immediate or may be once the second audio has been requested, received, buffered, and ready to play. The flow 100 continues with the receiving of the second audio 160 which was requested. The receiving may be from the same URL as the video or may be from a different location. The flow 100 may continue with buffering the second audio 162 before the playing the second audio begins. The amount of buffering may vary depending on bandwidth of the network, the amount of variation in the audio, or on other factors. The flow 100 may continue with synchronizing the second audio 170 with the second of the plurality of active videos. The second audio may be synchronized with the second of the plurality of active videos based on timestamps. The second audio may be synchronized with the second of the plurality of active videos based on elapsed times. When the plurality of active videos is started, a determination of elapsed time 176 since the start of the video may be made. The synchronizing may include delaying the second audio 172 or the synchronizing may include delaying the plurality of active videos 174. Additionally, the audio or video may be advanced or skipped forward in certain embodiments. The second audio may further be synchronized with the second of the plurality of active videos based on a time at which the second audio started playing.

The flow 100 continues with playing of the second audio 180 where the second audio is associated with a second of the plurality of active videos. Another video may subsequently be selected and the audio from that video may be played. Alternatively, audio for each of the displayed videos may be played for short durations and rotated through. In embodiments, there may be a pause in audio or some tone indicating that the audio is being switched. The flow 100 may continue with displaying information on the second audio 182 which was selected. This information may include, but is not limited to, encoding information, bit rate information, language, and source origination such as a URL.

Figure 2:
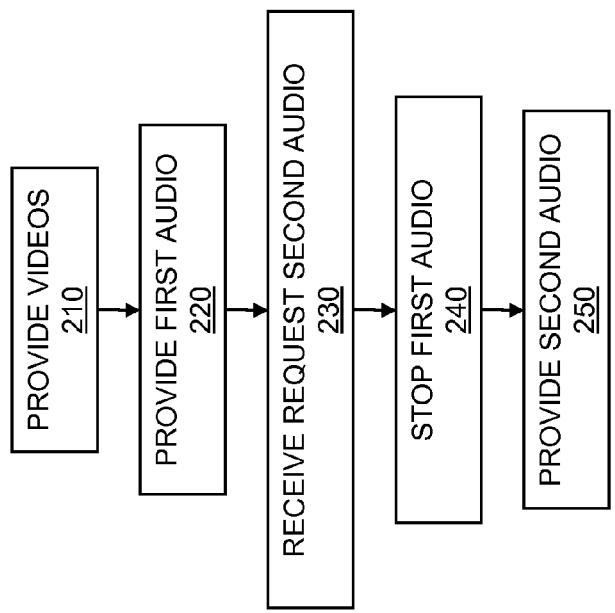
FIG. 2 is a flow diagram for sending different audio.

FIG. 2 is a flow diagram for sending different audio. The flow 200 describes a computer implemented method for sending different audio and may represent activity from a server perspective. The computer implemented method may involve a client-server interaction. A server may be attached to one or more client machines through an internet or intranet type network. The network may be wired, wireless, or a combination thereof. The flow 200 begins with providing a plurality of active videos 210 wherein the plurality of active videos are aggregated into a single video stream. The videos are "active" videos in that they depict motion, as opposed to "static" video thumbnail images. The single video stream may have been created by aggregating multiple independent videos from one or more locations into the single video stream to be sent to a client machine. The flow 200 continues with providing a first audio 220 which is associated with a first of the plurality of active videos. The first audio may be provided from the video streamer to a client machine. The flow 200 continues with receiving a request for a second audio 230 which is different from the first audio. In one embodiment, this may be user-initiated, such as by a user clicking a cursor on a desired active video. The ensuing request is for the audio that belongs to the desired active video. In another embodiment, the request for a second audio 230 may be automatically initiated. For example, a video display may present multiple videos, and then automatically cycle through the audio of each video for a predetermined amount of time. For example, a video display may present 12 active videos. The first audio is presented, corresponding to the first video. Then after 5 seconds, the first audio is stopped and the second audio is presented, which corresponds to the second video. Then after 5 seconds, the second audio is stopped and the third audio is presented, which corresponds to the third video, and so on. After the twelfth video, the first audio may be selected again and the process may repeat. The flow 200 continues with stopping providing of the first audio 240. The flow 200 continues with providing the second audio 250.

Figure 3:
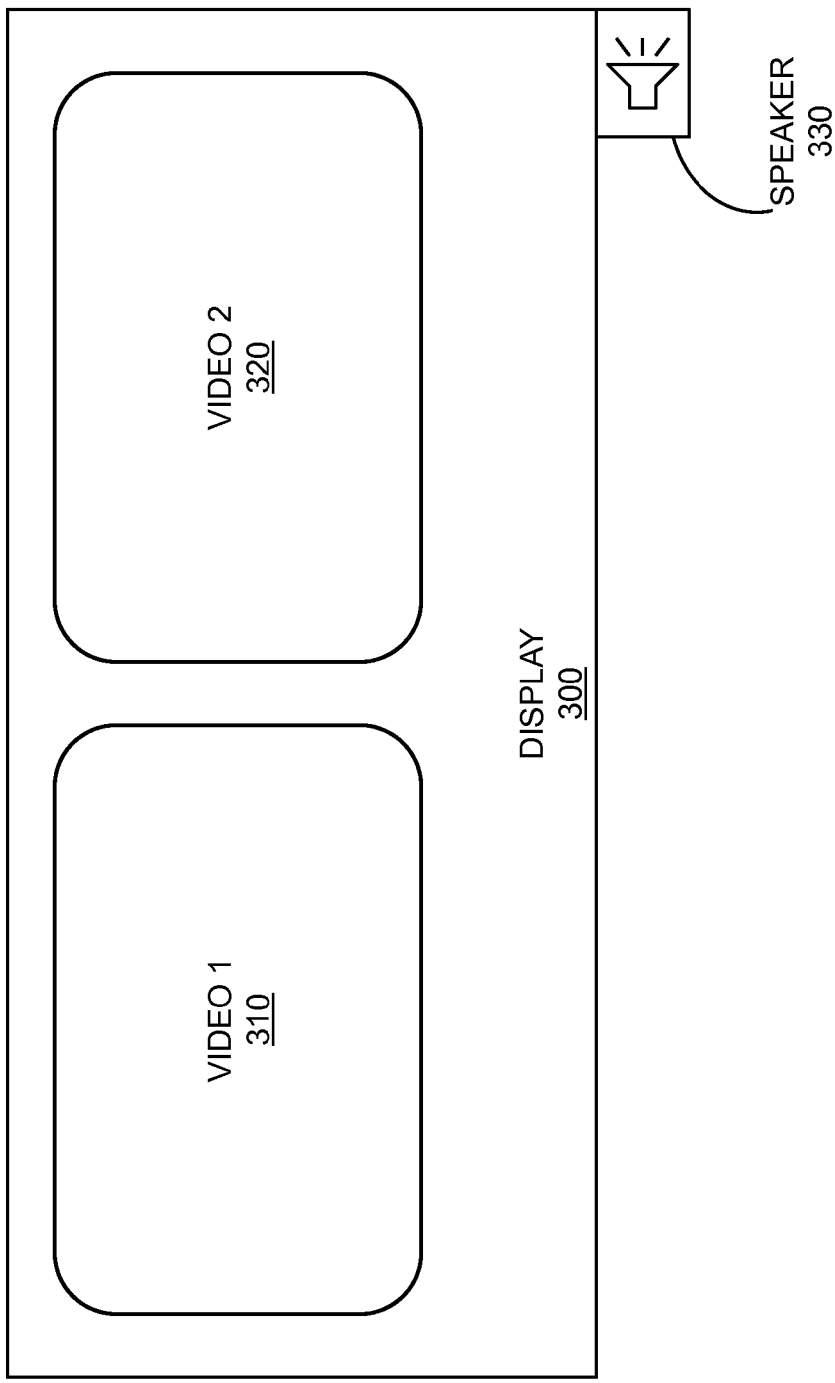
FIG. 3 is a diagram showing video and audio presentation.

FIG. 3 is a diagram presenting video and audio. A display 300 renders and presents a first video 310 and a second video 320. Note that while this embodiment shows two videos being presented simultaneously, in other embodiments other numbers of videos may be simultaneously presented including four, six, eight, 16, or some other number of videos. FIG. 3 also shows a speaker 330 which presents audio to a user. In embodiments, the speaker 330 may be part of the display 300. In other embodiments, the speaker 330 may be attached to a client machine by cables, wireless, or some other connection. In embodiments, the speaker 330 may be multiple speakers and may provide stereo, surround sound, or the like. A user may choose the second audio by clicking on one of the plurality of active videos shown in the display 300.

Figure 4:
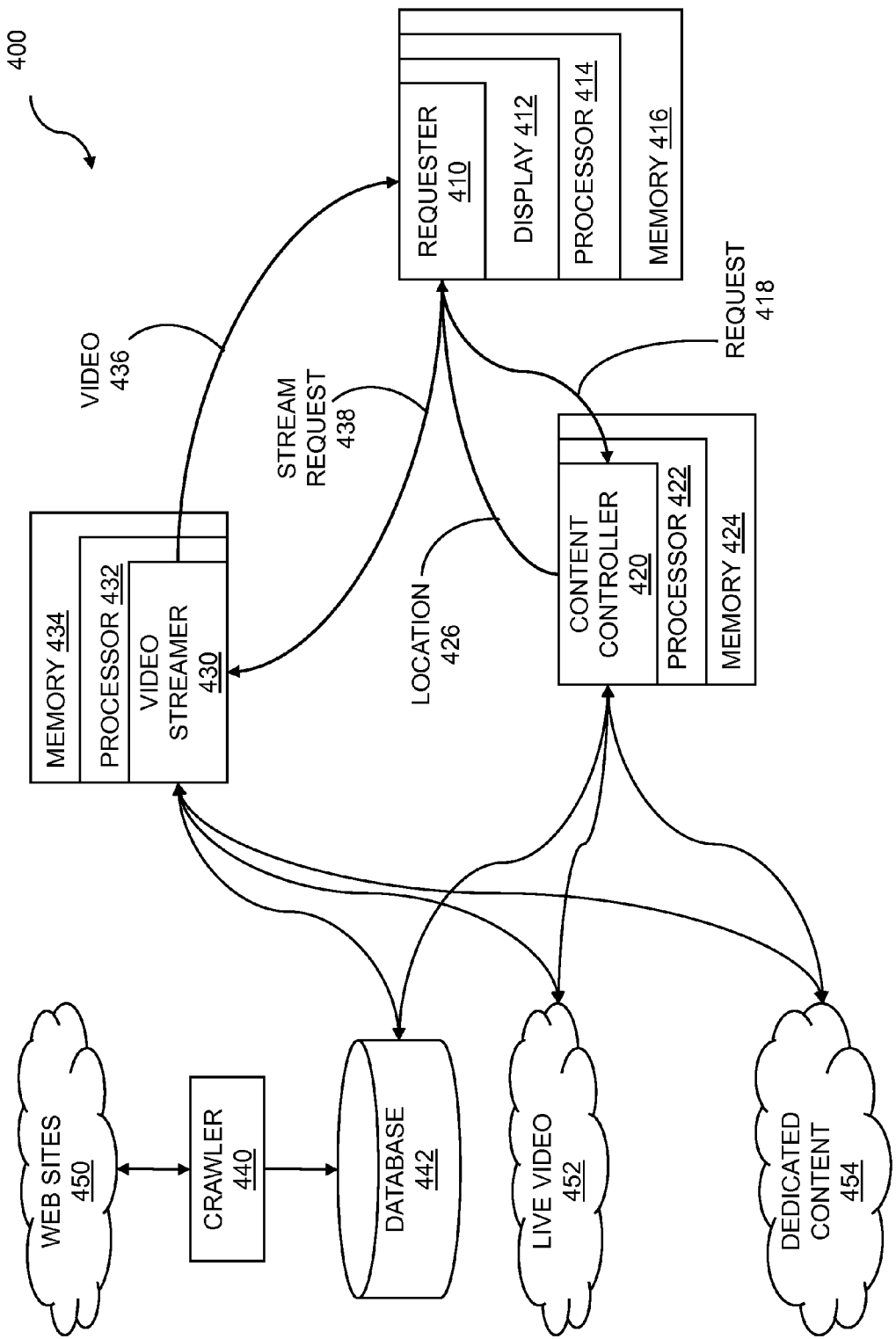
FIG. 4 is a system diagram for handling videos.

FIG. 4 is a system diagram for handling videos. A system 400 includes a requester 410, a content controller 420, a video streamer 430, a database 442, and a crawler 440. A requester 410 may be a client machine, such as a personal computer, a set top box, a television, or some other electronic device in some embodiments. In other embodiments the client machine may be a mobile device such as a smart phone, tablet, personal digital assistant (PDA), or the like. The requester 410 may have one or more viewers or users who view videos on one or more displays 412. The one or more viewers may view videos on a display 412 that may be attached to the requester 410 in some embodiments. The requester 410 may include one or more processors 414 for executing instructions stored in one or more memories 416. The memory 416 may be used for storing instructions, for temporary video and audio storage, for system support, and the like. A viewer may take action, such as making an entry using a mouse, keyboard, and/or touch screen that may cause the requester 410 to send a request 418 for information to a content controller 420. The content controller 420 may receive the request 418 for video content and access databases for the video information. The request 418 may travel through various networks including both wireless and wired connections and may traverse the Internet. The request 418 may be a search query or some other request for an alert or other information related to videos.

The content controller 420 may be a server machine and may have one or more processors 422 which may execute instructions stored in one or more memories 424. The memory 424 may be used for storing instructions, for temporary storage, for system support, and the like. The content controller 420 may send queries and obtain responses from various repositories which contain videos or information on videos. Based on the responses which the content controller 420 receives from the repositories, a location 426 may be sent back to the requester 410. The requester 410 may receive the location 426 in response to the request 418. The location may include a uniform resource locator (URL) where the requester 410 machine can find videos. The location may include a group of video identifiers associated with videos which are relevant to the request 418 which the requester 410 sent to the content controller 420. A URL address may include the video identifiers as part of the address which is sent for the location 426. In some embodiments, the location 426 may be sent directly to a video streamer 430 by the content controller 420. In some embodiments, the content controller 420 and the video streamer 430 may be part of the same machine or server and the content controller 420 and the video streamer 430 may share processors and/or memories.

The repositories for videos or video information may include one or more databases 442, live feed videos 452, dedicated content 454, and the like. Live video 452 may include broadcast, cable, and other televised materials that may include video of action being delivered in near real time with the action taking place and/or may include video that has been recorded or stored and is being delivered at a later time than the action occurred. Live video 452 may include web camera, security feeds, and other cameras from a variety of locations that may be delivered as it is captured or may have been captured at an earlier time. Dedicated content 454 may include videos provided by advertisers, educators, commercial companies, non-profits, and other sources of video material. In some embodiments, dedicated content 454 may include subscriber oriented web portals, such as Netflix™, Hulu™, and the like. So the plurality of active videos includes live video in some embodiments, including embodiments where the plurality of active videos includes broadcast video and embodiments where the plurality of active videos includes cable television video.

A web crawler 440 may obtain video information from across the Internet as well as, in some cases, an intranet, to identify videos. The web crawler 440 may be considered as a web agent, a web bot, a web robot, a web spider, or other program which orders information found across the web. The crawler 440 may traverse a series of web sites 450 to collect information on videos. A database 442 may store the video information which was collected. The videos themselves may be stored in the database 442 or information on the videos, including where the videos may be retrieved. The crawler 440 may also traverse various live video 452 feeds and dedicated content 454 providers. In some embodiments, the crawler 440 may obtain information from a social network which includes videos or links to videos.

The requester 410 may send the location 426 obtained from the content controller 420 to a video streamer 430 as a stream request 438. In some embodiments, the video identifiers provided with the location 426 may be analyzed by the requester 410. In some embodiments, the requester may choose a subset of the videos associated with the video identifiers to send in the stream request 438 to the video streamer 430. The video streamer 430 may have one or more processors 432 which may execute instructions stored in one or more memories 434. The memory 434 may be used for storing instructions, for temporary storage, for system support, and the like. The video streamer 430 may obtain videos from databases 442, live video 452 feeds, and dedicated content 454 sources as well as other locations. The video streamer 430 aggregates a plurality of active videos into a single video stream to provide the video stream as a video 436 to the requester 410. In some embodiments, the video streamer reduces the amount of video content included in one or more of the plurality of active videos since the videos will be shown on only a portion of a display. Thus, in embodiments, each of the plurality of active videos may include less information than a corresponding original video. One or more of the plurality of active videos may include a live feed video such as a news broadcast or sporting event.

Figure 5:
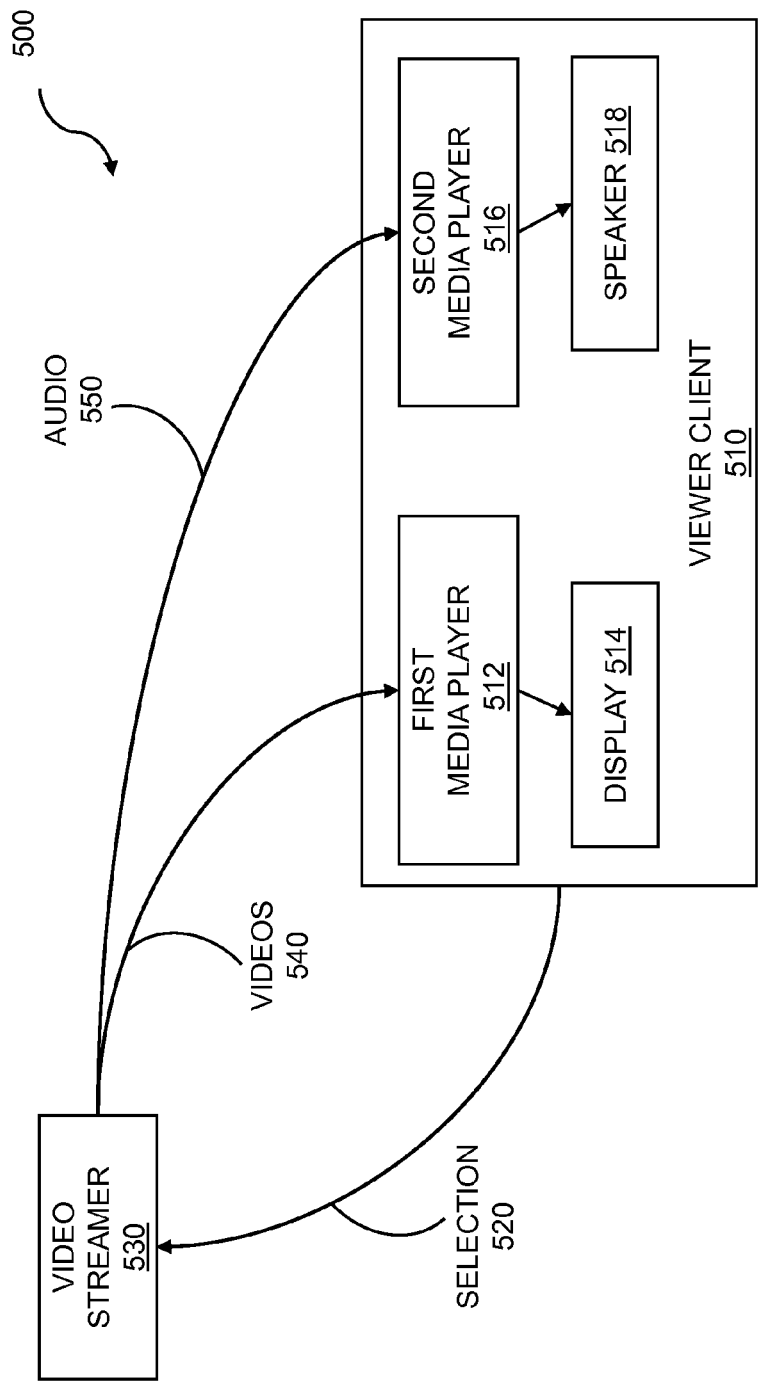
FIG. 5 is a system diagram showing audio selection.

FIG. 5 is a system diagram showing audio selection. A system 500 includes a video streamer 530 and a viewer client 510. The viewer client 510 may be the same as the requester 510. The video streamer 530 may have one or more processors which may execute instructions stored in one or more memories. The video streamer 530 provides audio 550 and multiple active videos 540 to the video client 510. The plurality of active videos 540 are aggregated into the single video stream on the video streamer 530. The video client 510 may include one or more processors for executing instructions stored in one or more memories. The memory may be used for storing instructions, for temporary video and audio storage, for system support, and the like. The users looking at the video client 510 may make an audio selection 520 which is sent to video streamer 530.

The viewer client 510 may comprise a first media player 512 and a second media player 516. The plurality of active videos 540 may be received by the first media player 512 and shown simultaneously on a display 514. The display 514 may be incorporated as part of the viewer client 510 or may be attached to the viewer client 510 by cables, wireless, or some other connection. The first media player 512 may buffer the video stream as needed for clean playback of the video on the display 514. Audio 550 may be received by the second media player 516. The audio 550 may be received by the second media player 516 and played on the speaker or speakers 518. The viewer client 510 may include one or more speakers 518 for presenting audio to a viewer. The speakers 518 may include multiple speakers and may provide stereo, surround sound, or the like. The speakers 518 may be part of the viewer client 510 or may be attached to the viewer client 510 by cables, wireless, or some other connection. Thus the plurality of active videos may be displayed with a first media player 512 and the playing of the second audio may be played with a second media player 516. The first media player 512 and the second media player 516 may be synchronized based on timestamps. The video and the audio may each include timestamps that were provided by the video streamer 530. The video or the audio may be delayed as needed so that they are played synchronously based on the timestamps. Alternately, the first media player 512 and the second media player 516 may be synchronized based on elapsed times since start of a video. The start of the video may provide a start for counting elapsed time. Since the audio and video may get out of synch over time, the audio or video may be delayed as needed based on the elapsed time which was counted. If the audio is switched to a second audio, the elapsed time is counted from the start of the video rather than from the start of the playing of the second audio. A time value for the time at which the audio was switched and the second audio started playing may be added in to the elapsed time calculation for the audio player. If a third audio is selected, a similar time value may be used in the elapsed time calculation and so on. In some embodiments, the first media player 512 and the second media player 516 may be combined into a single media player and thus the plurality of active videos and the first audio and the second audio may be played by a single media player.

The multiple videos 540 are contained within a single elementary stream. In embodiments, audio for each of the multiple videos are provided to the viewer client 510. In this case, the viewer client 510 makes the selection of one of the audio stream to be played for a user. In other embodiments, only a single audio stream is provided from the video streamer 530 to the viewer client 510. In this case, the selection 520 informs the video streamer 530 of the desired audio. A first audio may have been playing corresponding to one of the plurality of active videos. Based on the selection 520, the video streamer discontinues providing the first audio and instead provides a second audio corresponding to the selection 520. The second media player 516 may have its buffer flushed so that the second audio may be received and played as quickly as possible. In numerous embodiments, having a buffer flushed simply refers to discarding of data which has previously been received but which has not yet been played. Flushing of a buffer can refer to deleting data which has been temporarily stored in such a buffer. The buffer then begins storing data from the second audio in preparation for playing as soon as sufficient data has been buffered for adequate playback. In some embodiments, multiple audio may be provided to the viewer client 510 and the multiple audio may be multiplexed to the second media player 516. In some embodiments, efforts may be included to limit the amount of buffering by the second media player 516 so that audio may be quickly switched. In embodiments, the second media player 516 may have the capability to receive multiple audios and select among the multiple audio. In some embodiments, the first audio and the second audio each have less buffering than the plurality of active videos.

Figure 6:
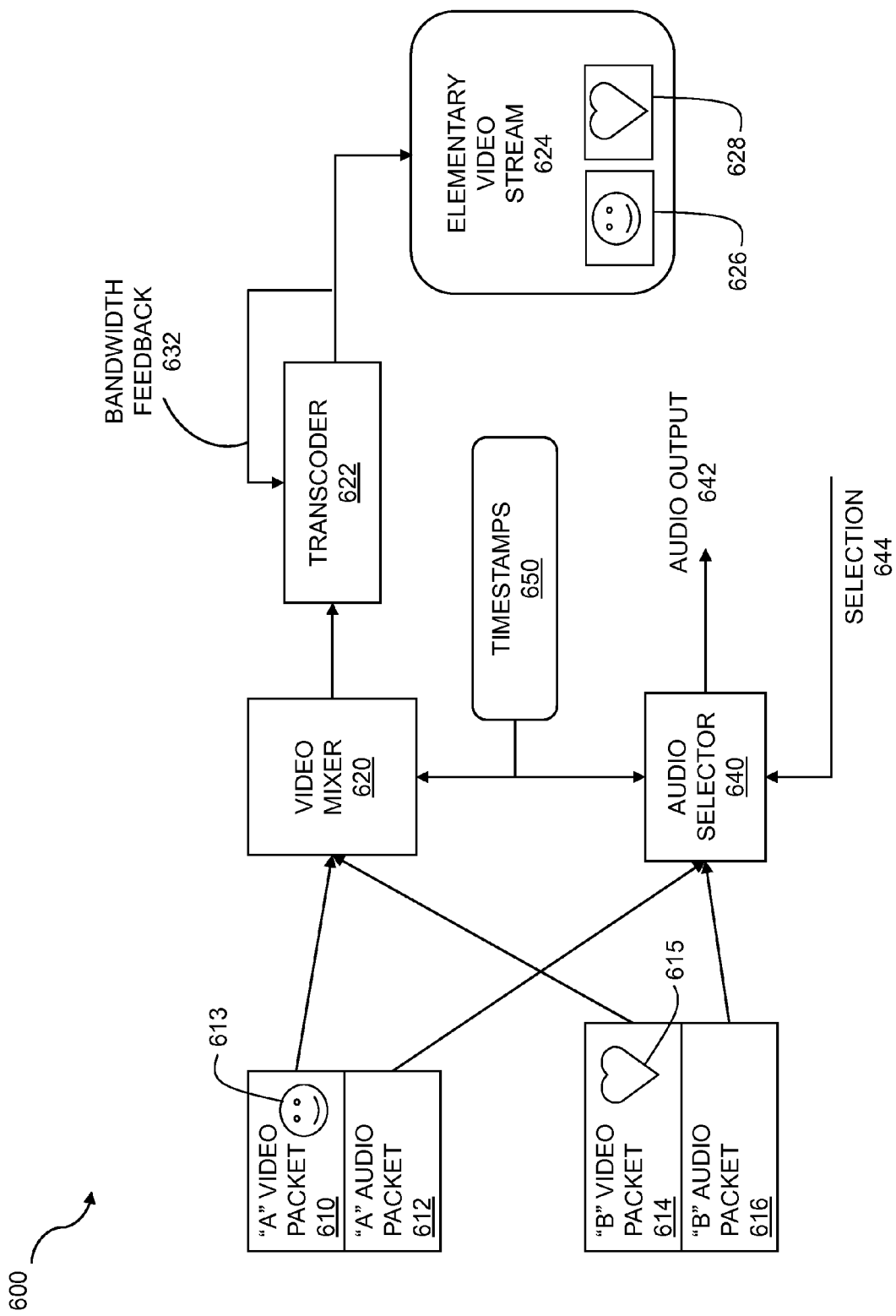
FIG. 6 is a system diagram for a video streamer.

FIG. 6 is a system diagram for a video streamer. The video streamer 600 receives an "A" video packet 610 for a first video and an associated "A" audio packet 612. The video streamer 600 also receives a "B" video packet 614 for a second video and an associated "B" audio packet 616. In practice, more videos may be received simultaneously by the video streamer 600 such as four, eight, 16, or some other number of videos. The "A" video packet 610 contains data for a first image 613 and the "B" video packet contains data for a second image 615. The first and second video packets (610 and 614) are routed to the video mixer 620 which aggregates the first video and the second video into a single video stream. The plurality of active videos may be decoupled from each of their respective audio packets.

The first and second audio packets (612 and 616) are input to audio selector 640. A selection signal 644 determines which audio (A or B) is output to the audio output 642. In some embodiments, the audio output is transcoded. The selection signal 644 is provided by the viewer client based on a selection of one of the videos. In alternate embodiments, the audio selector 640 cycles through the various audio inputs to provide short durations of each audio successively as the audio output 642. The audio output 642 is provided to the viewer client and is played by a media player on the viewer client. The output of the video mixer 620 may be input to a transcoder 622. The transcoder 622 may convert the output of the video mixer 620 to any suitable format, including, but not limited to H.264, M-JPEG, MPEG-1, MPEG-2, WMV, and MPEG-4. Optionally, a bandwidth feedback signal 632 may be used to adaptively adjust compression parameters of the transcoder 622 to make best use of available network bandwidth. The output of the transcoder 622 is elementary video stream 624 which contains frames that show a scaled image 626 corresponding to the "A" video packet 610 and a scaled images 628 corresponding to the "B" video packet 614. Each scaled video image (626 and 628) may undergo filtering and include less information than the corresponding original video images (613 and 615). As the audio is output separately at audio output 642, the videos in the elementary video stream 624 are decoupled from their respective audio.

In some embodiments, the output of the video mixer 620 is a raw (uncompressed) video format and the transcoder 622 converts the uncompressed video to a compressed video format. In other embodiments, the output of the video mixer 620 is a compressed video format, such as MPEG-2. The transcoder 622 may convert the video format to a different video format, such as MPEG-4, for example.

Timestamps 650 may be provided to the video mixer 620 and the audio selector 640 so that timestamps 650 can be included with the audio output 642 and the elementary video stream 624. The timestamps 650 may then be used to synchronize the audio and video at the viewer client. For example, the first audio may be synchronized with the first of the plurality of active videos based on timestamps. There may be a single timestamp per frame and all of the multiple active videos share that one timestamp.

Figure 7:
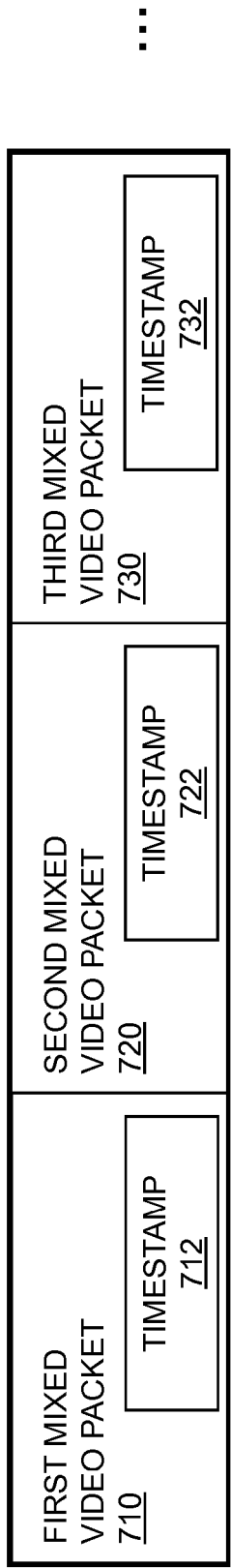
FIG. 7 is a diagram of an elementary video stream.

FIG. 7 is a diagram of an elementary video stream. The video stream is provided from the video streamer to the viewer client. As shown in FIG. 7, there is a first mixed video packet 710 which includes a timestamp 712, a second mixed video packet 720 which includes a timestamp 722, and a third mixed video packet 730 which includes a timestamp 732. Each mixed video packet, when rendered by a video player, shows scaled frames from the multiple videos fed into the video mixer (620 of FIG. 6). Hence, the elementary video stream is compatible with existing video players. From the video player perspective, the elementary video stream appears as a single video stream. However, when the stream is rendered, it shows multiple scaled videos, allowing a user to see multiple video streams playing simultaneously. Each mixed video packet has an associated timestamp that may be used to synchronize associated audio.

Figure 8:
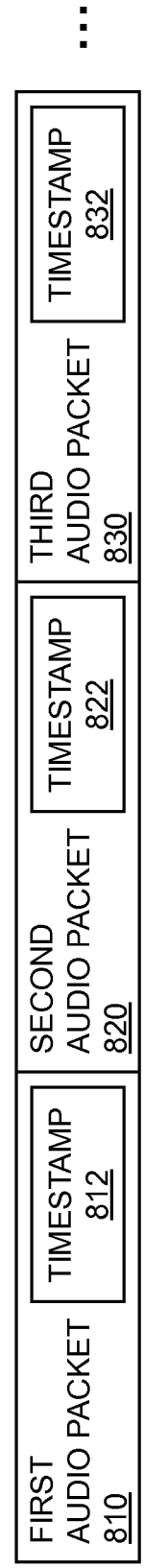
FIG. 8 is a diagram of an audio stream.

FIG. 8 is a diagram of an audio stream. The audio stream is provided from the video streamer to the viewer client. As shown in FIG. 8, there is a first audio packet 810 which includes a timestamp 812, a second audio packet 820 which includes a timestamp 822, and a third audio packet 830 which includes a timestamp 832. The timestamp in each audio packet may be used to synchronize it with an associated video. The synchronization may include presenting an audio player with an audio timestamp that is temporally close to the timestamp of the currently decoded video packet. The audio or video may be delayed in order to maintain or achieve synchronization.

Each of the above methods may be executed on one or more processors on one or more computer systems. Embodiments may include various forms of distributed computing, client/server computing, and cloud based computing. Further, it will be understood that for each flow chart in this disclosure, the depicted steps or boxes are provided for purposes of illustration and explanation only. The steps may be modified, omitted, or re-ordered and other steps may be added without departing from the scope of this disclosure. Further, each step may contain one or more sub-steps. While the foregoing drawings and description set forth functional aspects of the disclosed systems, no particular arrangement of software and/or hardware for implementing these functional aspects should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. Each element of the block diagrams and flowchart illustrations, as well as each respective combination of elements in the block diagrams and flowchart illustrations, illustrates a function, step or group of steps of the methods, apparatus, systems, computer program products and/or computer-implemented methods. Any and all such functions may be implemented by computer program instructions, by special-purpose hardware-based computer systems, by combinations of special purpose hardware and computer instructions, by combinations of general purpose hardware and computer instructions, by a computer system, and so on. Any and all of which may be generally referred to herein as a "circuit," "module," or "system."

A programmable apparatus that executes any of the above mentioned computer program products or computer implemented methods may include one or more processors, microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are not limited to applications involving conventional computer programs or programmable apparatus that run them. It is contemplated, for example, that embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized. The computer readable medium may be a non-transitory computer readable medium for storage. A computer readable storage medium may be electronic, magnetic, optical, electromagnetic, infrared, semiconductor, or any suitable combination of the foregoing. Further computer readable storage medium examples may include an electrical connection having one or more wires, a portable computer diskette, a hard disk, a random access memory (RAM), a read-only memory (ROM), an erasable programmable read-only memory (EPROM), Flash, MRAM, FeRAM, phase change memory, an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. Each thread may spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the entity causing the step to be performed.

While the invention has been disclosed in connection with preferred embodiments shown and described in detail, various modifications and improvements thereon will become apparent to those skilled in the art. Accordingly, the spirit and scope of the present invention is not to be limited by the foregoing examples, but is to be understood in the broadest sense allowable by law.

What is claimed is:

1. A computer implemented method for audio selection comprising:
    receiving, on a client machine, a plurality of simultaneously active videos wherein the plurality of simultaneously active videos is received in a single elementary video stream where a video streamer has aggregated a plurality of active videos into one elementary video stream to provide the single elementary video stream and where the client machine and the video streamer are different machines;
    displaying the plurality of simultaneously active videos on the client machine;
    playing a first audio wherein the first audio is associated with a first of the plurality of simultaneously active videos;
    requesting a second audio which is different from the first audio based on a selection;
    discontinuing playing of the first audio based on the selection; and
    playing of the second audio where the second audio is associated with a second of the plurality of simultaneously active videos and buffering the second audio before the playing the second audio begins.

2. The method of claim 1 further comprising selecting one of the plurality of simultaneously active videos to result in the selection.

3. The method of claim 1 further comprising receiving the second audio which was requested.

4. The method of claim 3 wherein the requesting of the second audio comprises a request for audio with a time point that corresponds to a later time than a current time of the plurality of active videos that are being displayed.

5. The method of claim 1 wherein the plurality of simultaneously active videos are displayed with a first media player and the playing of the second audio is played with a second media player.

6. The method of claim 5 wherein the first media player and the second media player are synchronized based on timestamps.

7. The method of claim 5 wherein the first media player and the second media player are synchronized based on elapsed times since start of a video.

8. The method of claim 1 further comprising synchronizing the second audio with the second of the plurality of simultaneously active videos.

9. The method of claim 8 wherein the second audio is synchronized with the second of the plurality of simultaneously active videos based on timestamps.

10. The method of claim 8 wherein the second audio is synchronized with the second of the plurality of simultaneously active videos based on elapsed times.

11. The method of claim 10 wherein the second audio is further synchronized with the second of the plurality of simultaneously active videos based on a time at which the second audio started playing.

12. The method of claim 8 wherein the synchronizing includes delaying the second audio.

13. The method of claim 8 wherein the synchronizing includes delaying the plurality of simultaneously active videos.

14. The method of claim 1 wherein the plurality of simultaneously active videos are decoupled from each of their respective audios.

15. The method of claim 1 further comprising displaying information on the second audio which was selected.

16. The method of claim 1 wherein a user chooses the second audio by clicking on one of the plurality of active videos.

17. A computer program product embodied in a non-transitory computer readable medium for audio selection, the computer program product comprising:
    code for receiving, on a client machine, a plurality of simultaneously active videos wherein the plurality of simultaneously active videos is received in a single elementary video stream where a video streamer has aggregated a plurality of active videos into one elementary video stream to provide the single elementary video stream and where the client machine and the video streamer are different machines;

code for displaying the plurality of simultaneously active videos on the client machine;

code for playing a first audio wherein the first audio is associated with a first of the plurality of active videos;

code for requesting a second audio which is different from the first audio based on a selection;

code for discontinuing playing of the first audio based on the selection; and code for playing of a second audio where the second audio is associated with a second of the plurality of simultaneously active videos and where the playing of the second audio is based on the selection and code for buffering the second audio before the playing the second audio begins.

18. A system for audio selection comprising:

a memory which stores instructions;

one or more processors attached to the memory wherein the one or more processors, when executing the instructions which are stored, are configured to:

receive, on a client machine, a plurality of simultaneously active videos wherein the plurality of simultaneously active videos is received in a single elementary video stream where a video streamer has aggregated a plurality of active videos into one elementary video stream to provide the single elementary video stream and where the client machine and the video streamer are different machines;

display the plurality of simultaneously active videos on the client machine;

play a first audio wherein the first audio is associated with a first of the plurality of simultaneously active videos;

request a second audio which is different from the first audio based on a selection;

discontinue playing of the first audio based on the selection; and play a second audio, which is different from the first audio, where the second audio is associated with a second of the plurality of simultaneously active videos and where the playing of the second audio is based on the selection and buffer the second audio before the playing the second audio begins.

19. The method of claim 1 wherein the first audio comprises a first audio stream, and the second audio comprises a second audio stream.

20. The method of claim 1 wherein a single audio stream comprises the first audio and the second audio.

21. The method of claim 1 wherein the single elementary video stream is included in a transport stream.

22. The method of claim 21 wherein the transport stream includes the first audio and the second audio.

23. The method of claim 1 wherein the single elementary video stream is included in a program stream.

24. The method of claim 23 wherein the program stream includes the first audio and the second audio.

25. The method of claim 1 wherein compression parameters of the single elementary video stream have been adaptively adjusted based on available network bandwidth.

* * * * *